Sept. 5, 1967 W. J. LONG 3,339,584
DIRECTIONAL CONTROL VALVE
Filed June 25, 1964 4 Sheets-Sheet 1

Inventor:
Wayne J. Long
By:[signature] Atty.

United States Patent Office 3,339,584
Patented Sept. 5, 1967

3,339,584
DIRECTIONAL CONTROL VALVE
Wayne J. Long, Auburn, Ind., assignor to Borg-Warner Corporation, Chicago, Ill., a corporation of Illinois
Filed June 25, 1964, Ser. No. 377,907
4 Claims. (Cl. 137—625.69)

This invention relates to directional control valves and more particularly to a directional control valve which utilizes a spool that is adapted to be shifted with respect to the valve body manually as well as in response to certain operating conditions.

Conventional directional control valves of the spool type may be subjected to excess stress and strain as a result of fluctuating system pressure. Pressure within the valve body may increase, for example, as a result of a condition such as an actuator piston of a fluid motor reaching the end of its stroke with the pump continuing to drive the piston beyond the end of its stroke.

Briefly described, this invention relates to a valve of the four-way spool type which utilizes a centering spring in combination with a spool detent such as, for example, that shown in United States Patent 2,749,772. Through this invention, a pressure-sensitive means is provided to seek inlet pressure from a plurality of ports within the body of the valve. Should pressure increase in excess of the fluid motor operating pressure, the pressure-sensitive means will be placed in operation. The inlet pressure is thus used to apply a sufficient axial thrust on the spool in either direction, to overcome the holding effect of the detent and allow the centering spring to return the spool to its neutral position.

It is generally understood that pressure may become excessive for reasons other than the piston of a fluid motor reaching the end of its stroke, for example, the fluid motor may encounter an obstruction or an excessive load.

Generally stated, the pressure-sensitive means of the present invention will return a valve spool to a neutral position from either the raised or lowered position of a fluid motor piston upon attainment of a predetermined pressure condition.

Though the invention is capable of modification, it is shown in a preferred embodiment which operates in conjunction with a hydraulic valve as illustrated in the accompanying drawings, in which.

Figure 1:
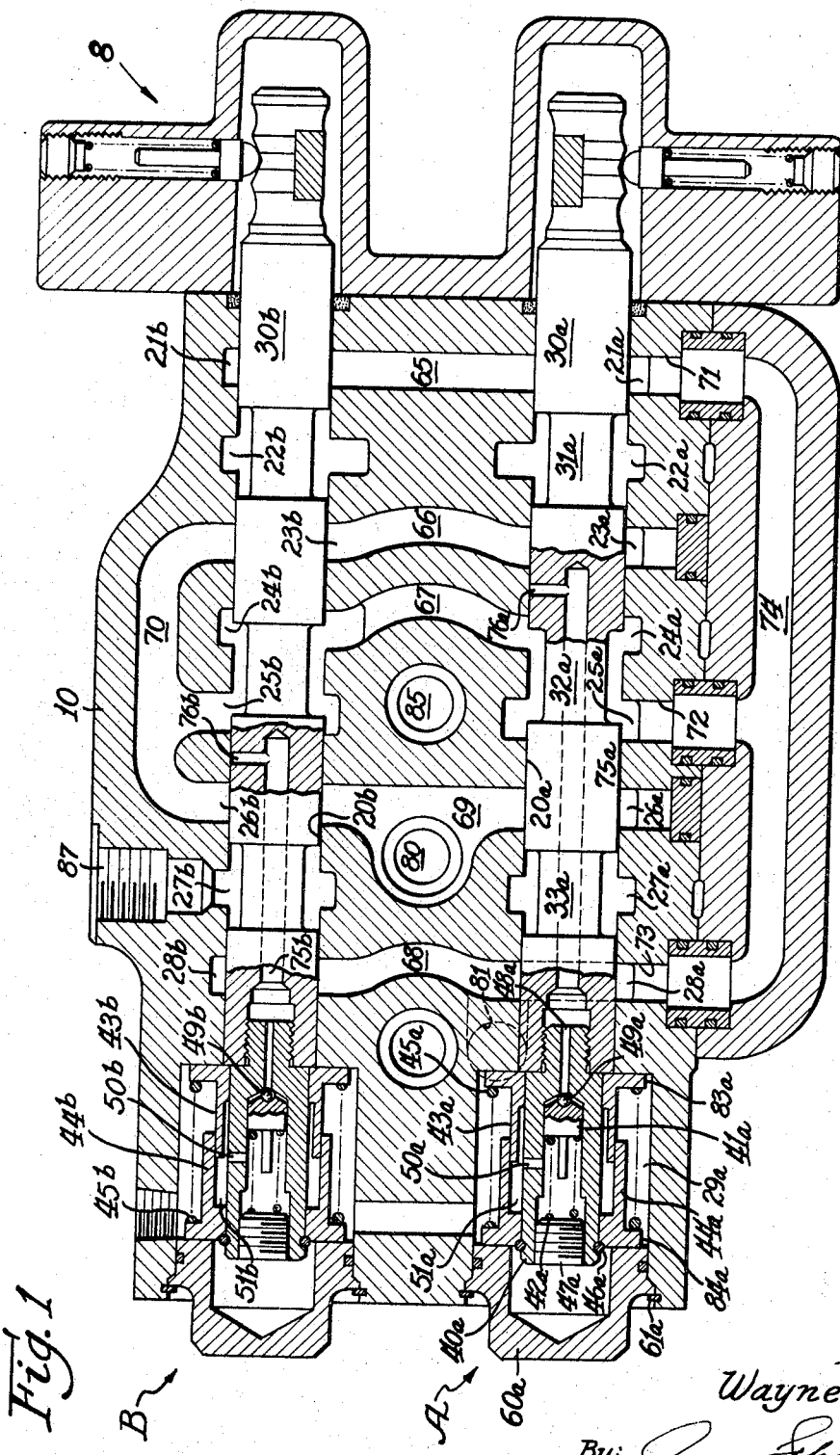
FIGURE 1 is a sectional view through a hydraulic valve mechanism taken on a horizontal plane along the axes of two movable valve members, A and B, each of which embody the features of this invention. As shown, the valve members are in a neutral position.

Referring now more particularly to the drawings, FIGURE 1 shows a sectional view of a four-way hydraulic valve mechanism which contains two valve spools, A and B. The two spools are shown for purposes of illustration, however, additional spools may be added. Throughout the description, numbers relating to the first spool A will carry the letter $a$ and the comparable components relating to the second spool B will carry the letter $b$.

The hydraulic mechanism shown in FIGURE 1 is comprised of a body 10, with bores 20a and 20b extending therethrough. The bores are fitted with axially slidable spools 30a and 30b, respectively. The valve receives hydraulic fluid from inlet 80 and passage 67 which are interconnected with each other by way of a conventional back flow check (not shown). The four-way valves vent hydraulic fluid through sump outlet 81. Valve spool A will hereinafter be described and it will be understood that there is a comparable component in valve unit B. Bore 20a is formed with a series of annular grooves defining chambers 21a, 22a, 23a, 24a, 25a, 26a, 27a, 28a and 29a, each of which is separated from its adjacent chamber by a suitable land. Axially slidable spool 30a is dimensionally fitted within bore 20a to sealingly engage the lands therein. There are reduced portions on spool 30a indicated as 31a, 32a and 33a which allow communication to be established between certain of the valve chambers as spool 30a is moved from left to right or right to left within bore 20a.

Chamber 29a at the left end of spool 30a contains the pressure-sensitive mechanism of this invention which includes a pilot valve body 40a which is threaded into the left end of spool 30a, a pilot valve member 41a, a pilot valve spring 42a, an inner sleeve 43a, an outer sleeve 44a, and valve spool centering spring 45a. Inner sleeve 43a is concentric with outer sleeve 44a and pilot valve body 40a.

Outer sleeve 44a is retained in pilot valve body 40a by means of a snap ring 46a. There is a plug 47a threaded into the left end of pilot valve body 40a which retains and adjusts the tension on pilot valve spring 42a within the pilot valve body 40a. Extending into the end of pilot valve body 40a opposite plug 47a is an axial passage 48a which leads to ball valve element 49a. Intermediate its ends, pilot valve body 40a is provided with a port 50a which extends outwardly into space 51a between outer sleeve 44a and inner sleeve 43a.

There is a removable cap 60a at the end of the pressure-sensitive mechanism which is retained in place by a snap ring 61a. Cap 60a allows for ease of access to the pressure-sensitive assembly to enable the tension to be adjusted on pilot spring 42a. It will be noted that the pressure at which the ball 49a will become unseated is determined by the amount of tension exerted on spring 42a urging pilot member 41a to the right.

There is a flange 84a on the end of outer sleeve 44a which is adapted to engage cap 60a and a flange 83a on inner sleeve 43a which is adapted to engage a shoulder of body 10 which forms a part of chamber 29a. Centering spring 45a thus extends between flange 84a and flange 83a.

Chambers 21a and 21b are placed in communication with each other by means of a cross passage 65. A passage 66 joins chamber 23a with chamber 23b and a passage 67 joins chamber 24a with chamber 24b. Passage 68 joins chamber 28a with chamber 28b. Passage 69 is joined by inlet 80 and connects chamber 26a with chamber 26b. Chamber 26b joins passage 70 which interconnects chambers 23b and 25b.

Chamber 21a joins passage 71 which in turn joins passage 74. Passage 74 connects with passage 72 and chamber 25a. Passage 74 is connected to sump 81 via passage 73 and chamber 28a. Thus, passages 71, 72 and 73 are interconnected with one another by passage 74.

Spool 30a is provided with a cylindrical passage 75a which extends from passage 48a in valve body 40a at the left end of spool 30a to its termination which is a transversely extending outlet port 76a.

Chambers 27a and 27b are connected to hydraulic lines which operate a fluid motor or load actuator (not shown). Port 87 is connected to one hydraulic line, however, the connecting port communicating with chamber 27a is not shown. Hydraulic lines from a fluid-motor are also connected with chambers 22a and 22b. Neither of these hydraulic lines are shown.

*Operation of automatic pressure release mechanism in a valve*

In order to illustrate the operation of the pressure-sensitive mechanism of this invention, it is necessary to describe the position of the spool with respect to the flow of hydraulic fluid within the valve mechanism. Fluid under pressure from a pump (not shown) is supplied to the hydraulic valve by way of inlet passage 80, and passage 67 as explained above. Cavities 27a and 27b are both controlled by a conventional back flow check valve which opens to pass fluid from the open center passageway 70.

In the neutral position of the spools, as shown in FIGURE 1, fluid is delivered to the hydraulic valve through inlet 80 and passage 67. The hydraulic fluid passes from inlet 80 to chamber 26b, passage 70, chambers 25b and 24b, passage 67, chambers 24a and 25a, passages 72, 74 and 73, chamber 28a and is returned to sump 81. It will be noted that chambers 22a and 22b, as well as chambers 27a and 27b are closed from communication with inlet 80.

Figure 2:
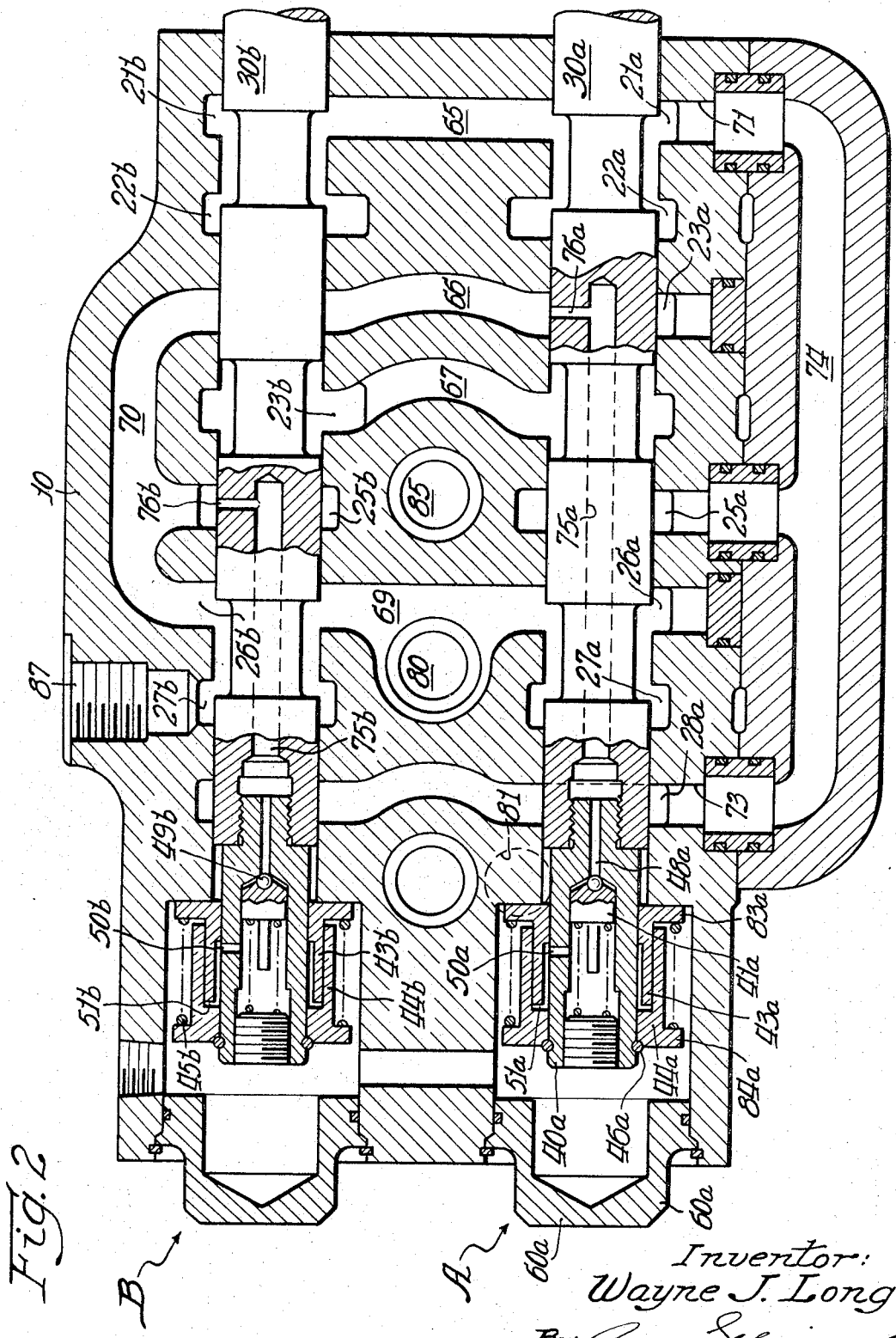
FIGURE 2 is a sectional view as shown in FIGURE 1 with the valve spools A and B moved to the right, i.e., in the "raised" position.

FIGURE 2 shows spools 30a and 30b moved to the right, i.e., to a "raised" or "lift" position. Hydraulic fluid from the pump enters inlet port 80 as above indicated. With respect to valve unit B, fluid enters inlet 80 and flows to chamber 26b. As shown, when spool 30b is placed to the right, chamber 26b is interconnected with chamber 27b and outlet 87. Thus, fluid is pumped from chamber 26b through chamber 27b, outlet 87, to operate the fluid motor, i.e., raise a piston within a cylinder (not shown). Exhaust fluid from the fluid motor is returned to chamber 22b. (The entry port to chamber 22b is not shown.) Fluid entering chamber 22b passes to vent port 81 via chamber 21b, passage 65, chamber 21a, passages 71, 74 and 73, and chamber 28a.

The fluid being delivered by the pump through the valve to the fluid motor and from the fluid motor through the valve to sump during movement of the fluid motor piston is delivered at a pressure corresponding to operating pressure. This operating pressure is less than full system pressure. When the piton reaches the end of its stroke, the pressure in the valve may increase up to full system pressure.

Port 76b in spool 30b is in communication with chamber 25b and passage 70. Passage 70 is in communication with chamber 26b and inlet port 80 and, as a result, the pilot valve element 49b is under substantially the same pressure as the pressure in the lift port. Thus, during that period when the piston is moving with respect to the cylinder, the pilot valve element 49b is under operating pressure. As the piston reaches the end of its stroke, the pressure exerted on pilot valve 49b increases. This pilot valve element 49b is adjusted to unseat at a pressure in excess of operating pressure and at or under full system pressure.

Thus, as the pressure increases from operating pressure conditions to unseat pilot valve element 49b, fluid escapes through port 50b into the annular space 51b adjacent sleeves 44b and 43b. The pressure in space 51b acts to shift outer sleeve 44b and inner sleeve 43b with respect to each other. The force exerted in shifting the sleeves with respect to each other is sufficient to overcome the detent. As the detent is released, centering spring 45b causes the spool to shift to the neutral position illustrated in FIGURE 1.

The spool 30b is initially moved to right or left by a hand lever or the like situated on the end opposite the pressure-sensitive mechanism (not shown). The lever may be hand operated or may be releasably lodged in either the right (as shown in FIGURE 2) or left operating position by means of a spring operated ball detent 8 disposed in the bore of a lever, as indicated above. Irrespective of the means used to retain the spool in the right or left position, the spool will be urged to the left, i.e., neutral position, by pressure exerted on the outer sleeve 44b.

With respect to valve unit A, hydraulic fluid enters inlet 80 and flows to chamber 26a and in turn, to chamber 27a. Chamber 27a is in communication with a fluid motor (not shown) and fluid enters the fluid motor from chamber 27a. Exhaust fluid from the fluid motor is returned to chamber 22a. As shown in FIGURE 2, when the spool 30a is moved to the right, fluid is returned to sump 81 from chamber 22a via chamber 21a, passages 71, 74 and 73, and chamber 28a. It will be noted that port 76a in spool 30a is situated in chamber 23a, which, in turn, is in communication with passage 66, chamber 23b, passage 70, chamber 26b, passage 69, and inlet 80. Fluid pressure from the inlet thus passes through inlet port 76a in spool 30a through passage 75a and 48a in valve body 40a. The hydraulic fluid exerts pressure on valve element 49b.

When the end of the cylinder stroke is reached in the fluid motor, there is an increase in line pressure. The increased line pressure is sufficient to unseat valve element 49a and move pilot valve member 41a to the rear, i.e., to the left. Hydraulic pressure is thus released through port 50a to space 51a between outer sleeve 44a and inner sleeve 43a. The line pressure exerted in space 51b will urge outer sleeve 44a to the left and inner sleeve 43a to the right. Flange 83a on inner sleeve 43a is adapted to engage body 10 which causes sleeve 43b to remain immobile. Outer sleeve 44b is urged to the left and as a result of snap ring 46a, which retains sleeve 44b on spool 30a, spool 30a is also urged to the left along with outer sleeve 44a. Spool 30a will move to the left until flange 84a on outer sleeve 44a abuts cap 60a. At that point where flange 84a engages cap 60a, spool 30a will be in the neutral position shown in FIGURE 1. The neutral position terminates the passage of fluid into chambers 27a and 22a, thus preventing hydraulic fluid from passing out of the valve through chamber 27a or into the valve via chamber 22a. As indicated with respect to valve unit B, spool 30a may be moved to the right or left by a hand lever or the like and irrespective of the means by which the spool is moved, the spool will be urged to the left by the pressure exerted on the outer sleeve 44a of the pressure-sensitive mechanism of this invention.

Figure 3:
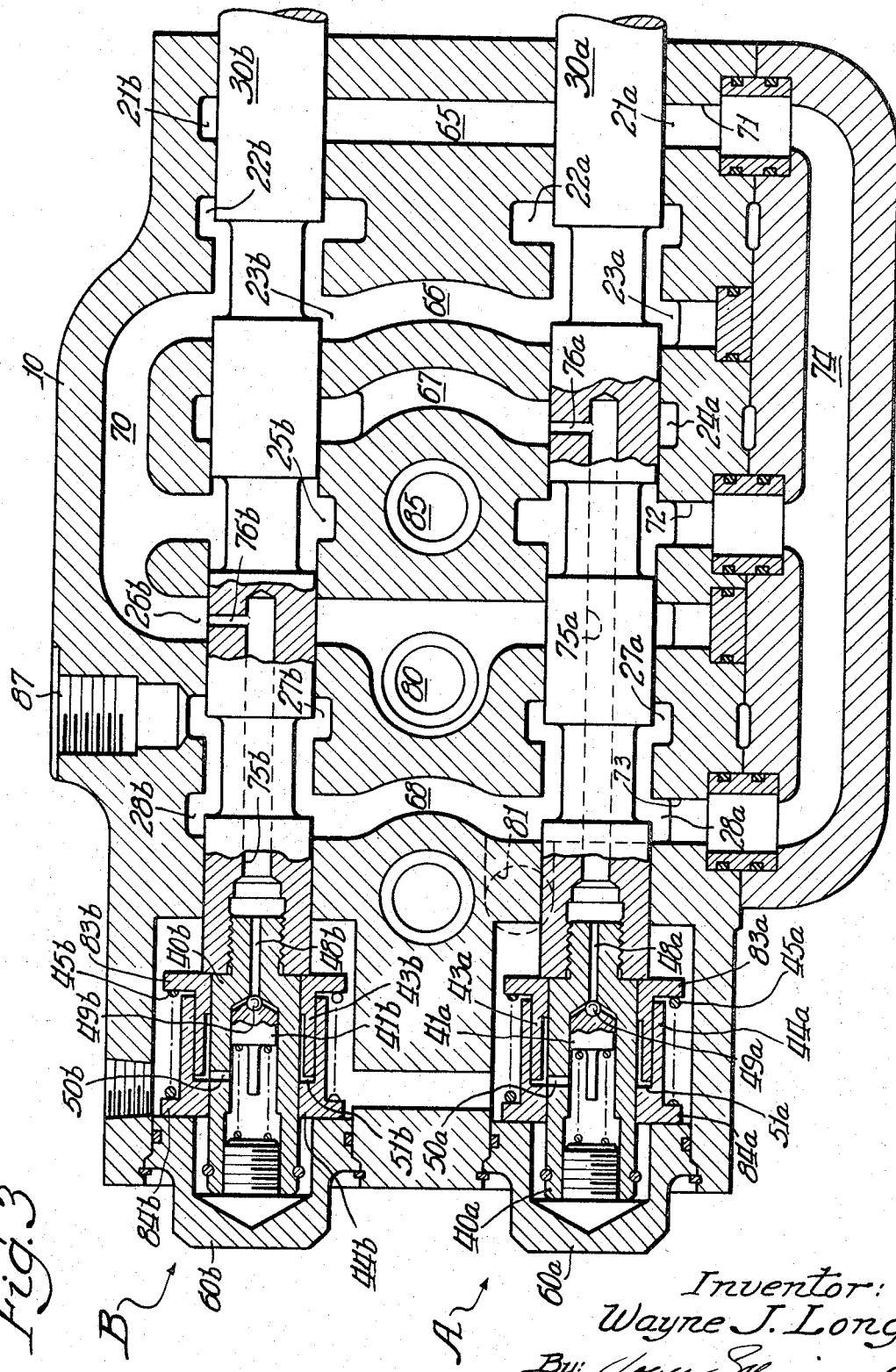
FIGURE 3 is a sectional view such as that shown in FIGURE 1 with the valve spools A and B moved to the left, i.e., in the "lowered" position.

FIGURE 3 shows the spools 30a and 30b in the down position, i.e., with the spools to the left instead of to the right as shown in FIGURE 2. By "down," it is meant the position of the piston in the fluid motor attached to the valve. There will be a reverse flow of fluid to the fluid motor from the valves in FIGURE 3 from that shown in the valves of FIGURE 2.

With spool 30b to the left as shown in FIGURE 3, hydraulic fluid enters inlet port 80 and passage 67 as indicated above. Hydraulic fluid flows from inlet 80 to chamber 26b, passage 70, chamber 23b, chamber 22b to a fluid motor (not shown). Hydraulic fluid returns to port 87, in turn, to chamber 27b, chamber 28b, passage 68, to sump 81. Port 76b is situated in chamber 26b when spool 30b is to the left, as shown in FIGURE 3, and is thus subjected to valve inlet pressure. Hydraulic fluid thus enters port 76b, passage 75b, and passage 48b in valve member 40b. At the end of the cylinder stroke of the fluid motor, there is an increase of pressure in the system. The increased pressure is sufficient to unseat pilot valve ball element 49b and move pilot valve member 41b to the left. Thus, line pressure is released through port 50b in valve body 40b to that space 51b between outer sleeve 44b and inner sleeve 43b. Pressure exerted within space 51b sufficiently reinforces that pressure exerted by centering spring 45b to cause outer sleeve 44b to be urged to the left and inner sleeve 43b to be urged to the right. Flange 84b on outer sleeve 44b engages cap 60b thus rendering sleeve 44b immobile. Inner sleeve 43b engages the end of spool 30b and urges spool 30b to the right. As spool 30b moves to the right, it reaches a point where flange 83b on inner sleeve 43b engages body 10. At this point, spool 30b is in the neutral position shown in FIGURE 1.

Referring now to valve A in FIGURE 3, it will be noted that with spool 30a to the left, hydraulic fluid enters inlet port 80, passage 67 as indicated. Hydraulic fluids flows from inlet 80 to chamber 26b, passage 70, chamber 23b, passage 66, chamber 23a to chamber 22a and thus to the fluid motor. Hydraulic fluid returns via chamber 27a to chamber 28a and thus to sump 81. It will be noted that port 76a is situated in chamber 24a which is connected to passage 67. Hydraulic fluid thus enters port 76a, passage 75a, and passage 48a in valve member 40a. At the end of the cylinder stroke of the fluid motor, there is an increase in pressure from operating pressure. The increased pressure is sufficient to unseat pilot valve ball element 49a to move the pilot valve member 41a to the left. Thus, line pressure is released through port 50a in valve body 40a to that space 51a between outer sleeve 44a and inner sleeve 43a. Pressure exerted within space 51a sufficiently reinforces that pressure exerted by centering spring 45a to cause outer sleeve 44a to be urged to the left and inner sleeve 43a to be urged to the right. Flange 84a on outer sleeve 44a engages cap 60a and thus renders sleeve 44a immobile. Inner sleeve 43a engages the end of spool 30a and urges spool 30a to the right. As spool 30a moves to the right, it reaches a point where flange 83a on inner sleeve 43a engages valve body 10 and at that point, spool 30a is in the neutral position shown in FIGURE 1.

Figure 4:
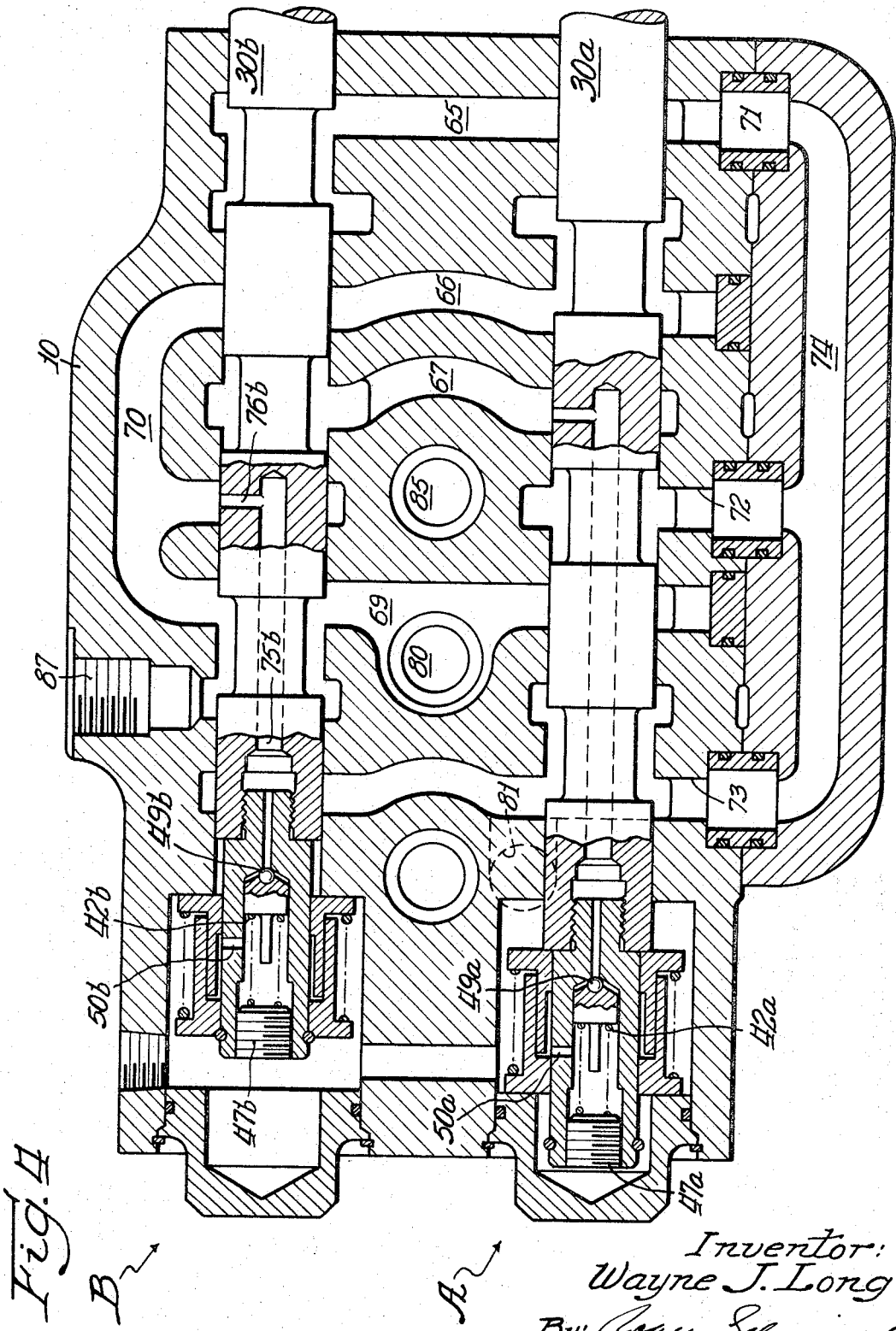
FIGURE 4 is a sectional view as shown in FIGURE 1 with the upper valve spool B in the "raised" position, i.e., to the right and the bottom spool A in the "lowered" position, i.e., to the left.

FIGURE 4 shows the spool 30b in the same position as that shown in FIGURE 2 and spool 30a in that position shown in FIGURE 3. It will be noted that irrespective of the position of the spools, the flow pattern will remain the same in valve 10 and the pressure-sensitive mechanism will operate to admit fluid pressure to the pressure responsive sleeves to cause the sleeves to move their respective hydraulic valve spools to the neutral position when a predetermined maximum pressure is exceeded.

In the embodiments shown in FIGURES 1 through 4, the plugs 47a and 47b may be adjusted to place tension upon pilot spring 42a of the check valve. The tension on springs 42a and 42b determines that point at which there is sufficient pressure on ball elements 49a and 49b to unseat them and release pressure through ports 50a and 50b respectively to cause the spools to move to the neutral position.

It is obvious that many modifications and variations of the present invention are possible in light of the above description. For example, there may be one valve spool or a plurality without interfering with the operation of the automatic pressure release mechanism; thus, it will be understood that this invention embraces all those embodiments that fall within the scope of the appended claims.

What is claimed is:
1. A directional control valve comprising a valve body having a spool bore therein; a plurality of spaced apart passages in said valve body in communication with said spool bore; a valve spool positioned within said spool bore including a plurality of spaced apart lands; said spool being operative in combination with said valve body to assume a neutral, a lift, and a drop position; a chamber formed in said valve body at one end of said spool bore; a passage formed in said spool extending from one end thereof longitudinally therein providing for communication with one of said spaced-apart ports with said spool in said lift position and with another of said spaced-apart ports with said spool in said drop position; a pilot valve body connected to said one end of said spool defining a shoulder between said pilot valve body and said one end of said spool; a pilot valve passage extending within said pilot valve body providing communication between said passage and an exterior portion of said pilot valve body; a pressure relief valve formed in said pilot valve passage; said chamber providing a first shoulder and a second shoulder, a cylinder assembly positioned on the exterior portion of said pilot valve body including concentrically arranged inner and outer sleeve members defining a chamber in communication with said pilot valve passage; said cylinder assembly operatively arranged to engage said first shoulder and said second shoulder, and resilient means associated with said cylinder assembly to urge said valve spool toward said neutral position.

2. The directional control valve of claim 1 wherein there are means to regulate the pressure at which said pressure relief valve opens.

3. The directional control valve of claim 1 wherein the inner and outer sleeves are axially slidable on said pilot valve body.

4. The directional control valve of claim 1 wherein the inner sleeve includes a radially extending flange and the outer sleeve includes a radially extending flange and the resilient means extends between these flanges.

References Cited
UNITED STATES PATENTS 2,757,641   8/1956   Meddock _____ 137—624.27
2,848,014   8/1958   Tennis _____ 137—624.27

M. CARY NELSON, *Primary Examiner.*

M. P. SCHWADRON, *Assistant Examiner.*